(12) United States Patent
Oliver et al.

(10) Patent No.: US 9,911,354 B2
(45) Date of Patent: Mar. 6, 2018

(54) HANDS-FREE MUSIC NOTATION DISPLAY SYSTEM

(71) Applicants: Michael Oliver, Lawrence, KS (US); Rachel Oliver, Lawrence, KS (US); Ann Francis, Lawrence, KS (US)

(72) Inventors: Michael Oliver, Lawrence, KS (US); Rachel Oliver, Lawrence, KS (US); Ann Francis, Lawrence, KS (US)

( * ) Notice: Subject to any disclaimer, the term of this patent is extended or adjusted under 35 U.S.C. 154(b) by 0 days.

(21) Appl. No.: 14/736,765

(22) Filed: Jun. 11, 2015

(65) Prior Publication Data

US 2015/0364055 A1 Dec. 17, 2015

Related U.S. Application Data

(60) Provisional application No. 62/010,533, filed on Jun. 11, 2014.

(51) Int. Cl.

| | | |
|---|---|---|
| G09B 15/02 | (2006.01) |
| G09B 15/00 | (2006.01) |
| G09B 5/12 | (2006.01) |
| G10G 1/00 | (2006.01) |
| G10G 7/00 | (2006.01) |
| G10H 1/00 | (2006.01) |
| G10H 3/00 | (2006.01) |

(52) U.S. Cl.
CPC ............ *G09B 15/023* (2013.01); *G09B 5/12* (2013.01); *G09B 15/002* (2013.01); *G10G 1/00* (2013.01); *G10G 7/00* (2013.01); *G10H 1/0008* (2013.01); *G10H 3/00* (2013.01)

(58) Field of Classification Search
CPC ..................................................... G09B 15/023
USPC ............................................................ 84/746
See application file for complete search history.

(56) References Cited

U.S. PATENT DOCUMENTS

| | | | | |
|---|---|---|---|---|
| 2,540,928 A | * | 2/1951 | Briggs ................. | A47B 23/004 248/443 |
| 2,792,666 A | * | 5/1957 | Green .................. | A47B 23/004 248/443 |
| 3,437,002 A | * | 4/1969 | Defauw ............... | A47B 23/004 84/329 |
| 3,543,633 A | * | 12/1970 | Batten .................. | A47B 23/004 248/229.23 |
| 4,501,403 A | * | 2/1985 | Goodrich ............. | G10G 7/00 211/88.01 |
| 4,832,302 A | * | 5/1989 | Anderson ............. | G10D 1/08 248/443 |
| 5,760,323 A | * | 6/1998 | Romero ............... | G10H 1/0008 84/470 R |

(Continued)

*Primary Examiner* — David Warren
*Assistant Examiner* — Christina Schreiber
(74) *Attorney, Agent, or Firm* — Global Intellectual Property Agency, LLC; Daniel Boudwin

(57) ABSTRACT

A hands-free music notation display system for playing digital sheet music. The system includes a tablet that displays digital sheet music and houses the system's operating components therein. The housing within the tablet includes a communication link connecting the tablet to one or more foot controls. The foot controls provide the ability for a user to display the next or previous page on the tablet with his or her foot, thereby permitting the user to remain hands-free to play an instrument. The tablet includes a plurality of buttons that permit a user to load and play sheet music thereon.

4 Claims, 3 Drawing Sheets

(56) References Cited

U.S. PATENT DOCUMENTS

| | | | | |
|---|---|---|---|---|
| 5,990,403 | A * | 11/1999 | Membreno | G10G 7/02 84/453 |
| 7,098,392 | B2 * | 8/2006 | Sitrick | G09B 15/002 84/477 R |
| 7,542,273 | B2 * | 6/2009 | Laycock | G09B 5/12 361/679.27 |
| 8,445,766 | B2 * | 5/2013 | Raveendran | G10G 1/00 84/470 R |
| 9,035,165 | B2 * | 5/2015 | Cho | G10H 1/0008 84/746 |
| 2001/0037719 | A1 * | 11/2001 | Gardner | G09B 15/023 84/478 |
| 2003/0110926 | A1 * | 6/2003 | Sitrick | G09B 15/023 84/477 R |
| 2004/0040433 | A1 * | 3/2004 | Errico | G09B 15/023 84/477 R |
| 2005/0081701 | A1 * | 4/2005 | Shao | G10G 1/00 84/612 |
| 2006/0145942 | A1 * | 7/2006 | Maatta | G02B 5/045 345/1.3 |
| 2006/0214922 | A1 * | 9/2006 | Moore | B43L 1/00 345/173 |
| 2007/0175316 | A1 * | 8/2007 | Kumarova | G09B 15/002 84/609 |
| 2007/0182663 | A1 * | 8/2007 | Biech | G06F 1/1618 345/1.1 |
| 2008/0047413 | A1 * | 2/2008 | Laycock | G09B 5/12 84/477 R |
| 2008/0060500 | A1 * | 3/2008 | La | G10G 1/00 84/486 |
| 2008/0060506 | A1 * | 3/2008 | Laycock | G09B 5/12 84/645 |
| 2011/0203442 | A1 * | 8/2011 | Raveendran | G09B 15/023 84/483.1 |
| 2012/0266735 | A1 * | 10/2012 | Dunlop | F16M 11/041 84/329 |
| 2014/0123834 | A1 * | 5/2014 | Wang | B42D 9/04 84/486 |
| 2015/0348523 | A1 * | 12/2015 | Bisnauth | G09B 15/023 84/483.1 |
| 2015/0364055 | A1 * | 12/2015 | Oliver | G09B 15/023 84/746 |

* cited by examiner

HANDS-FREE MUSIC NOTATION DISPLAY SYSTEM

CROSS REFERENCE TO RELATED APPLICATION

This application claims the benefit of U.S. Provisional Application No. 62/010,533 filed on Jun. 11, 2014. The above identified patent application is herein incorporated by reference in its entirety to provide continuity of disclosure.

BACKGROUND OF THE INVENTION

Field of the Invention

The present invention relates to hands-free music notation display systems. More specifically, the present invention provides a system comprising a tablet adapted to display digital sheet music thereon, wherein the tablet is wirelessly connected to one or more foot controls adapted to turn a page of digital sheet music.

Many musicians view sheet music to play a particular piece of music. When musicians play instruments without sheet music, they can lose the beat, miss a note, and make a mistake regarding the musical timing. Some musicians become mentally stressed when trying to memorize long songs and can make many mistakes while playing. However, reading sheet music while playing is highly inconvenient when a musician has to remove a hand from the instrument in order to turn a page, which can result in dropping the sheet, turning to the incorrect page, or losing their timing. Therefore, there is a need in the prior art for a device that provides a display for sheet music that allows a user to read music in a hands-free manner.

It is submitted that the present invention substantially diverges in design elements from the prior art and consequently it is clear that there is a need in the art for an improvement to existing hands-free music notation display systems. In this regard the instant invention substantially fulfills these needs.

SUMMARY OF THE INVENTION

In view of the foregoing disadvantages inherent in the known types of hands-free music notation display systems now present in the prior art, the present invention provides a new hands-free music notation display system wherein the same can be utilized for providing convenience for the user when reading music.

It is therefore an object of the present invention to provide a new and improved hands-free music notation display system that has all of the advantages of the prior art and none of the disadvantages.

It is another object of the present invention to provide a hands-free music notation display system comprising a tablet having a screen adapted to display digital sheet music.

Yet another object of the present invention is to provide a hands-free music notation display system comprising one or more foot pedals connected to the tablet and operating components therein so as to allow a user to turn a page of the digital sheet music by depressing the foot pedals.

Yet another object of the present invention is to provide a hands-free music notation display system wherein the tablet comprises a first section adjustably secured to a second section by one or more hinges so as to store the tablet in a compact configuration.

Yet another object of the present invention is to provide a hands-free music notation display system further comprising an attachment mechanism for removably securing the tablet to an instrument.

Another object of the present invention is to provide a hands-free music notation display system wherein the tablet comprises operating components therein that retains allows a user to display sheet music thereon.

Another object of the present invention is to provide a hands-free music notation display system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
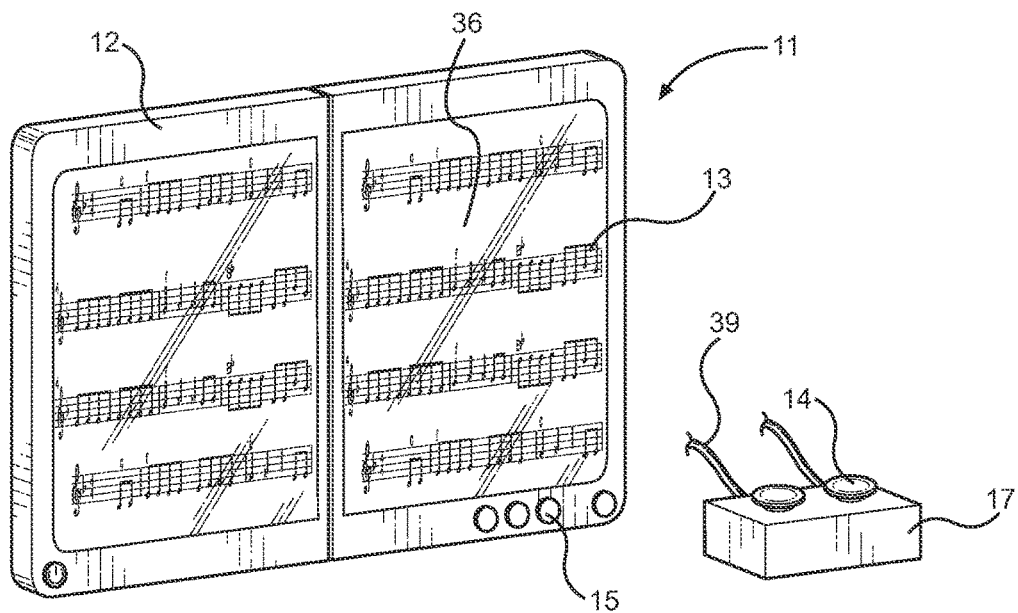
FIG. 1 shows a perspective view of an embodiment of the hands-free music notation display system.

Reference is made herein to the attached drawings. Like reference numerals are used throughout the drawings to depict like or similar elements of the hands-free music notation display system. For the purposes of presenting a brief and clear description of the present invention, the preferred embodiment will be discussed as used for displaying digital sheet music. The figures are intended for representative purposes only and should not be considered to be limiting in any respect.

Figure 2:
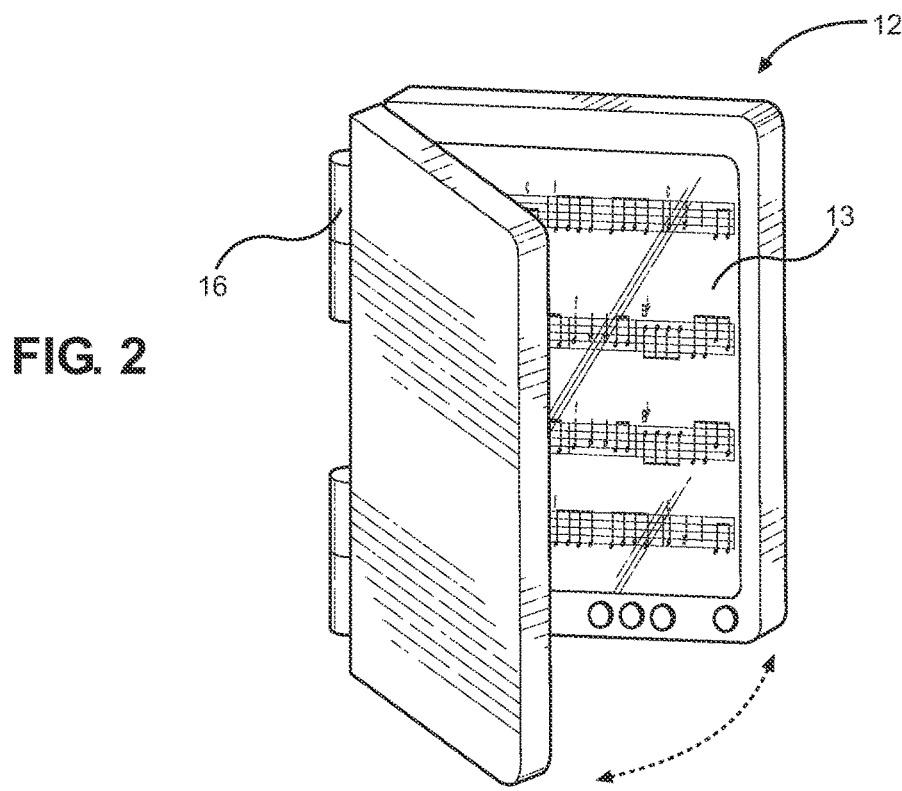
FIG. 2 shows a perspective view of the tablet of the hands-free music notation display system in a folded configuration.

Referring now to FIGS. 1 and 2, there is shown a perspective view of an embodiment of the hands-free music notation display system and a perspective view of the tablet of the hands-free music notation display system in a folded configuration. The hands-free music notation display system 11 comprises a tablet computer 12 that houses the system's operating components therein and includes one or more screens 13 adapted to display digital sheet music 36 thereon. The tablet 12 comprises a first section adjustably secured to a second section by one or more hinges 16. The tablet 12 is movable between an open configuration and a closed configuration, such that the tablet 12 can be folded in a compact configuration. In an open configuration, the first section and the second section can lie in a single plane. In the closed configuration the first and second section are adapted to rotate towards one another and can be oriented parallel to one another. The upper surface of each section comprises a display screen 13, wherein the screen 13 is preferably a liquid crystal display (LCD). The tablet 12 and screen 13 are preferably rectangular in shape so as to allow digital sheet music 36 to be displayed thereon in a corresponding rectangular shape.

The tablet 12 further includes a plurality of controls 15 thereon, wherein a user can use the controls 15 to operate the system 11. The controls 15 are adapted to allow a user to turn the hands-free music notation display system 11 on or off and select sheet music to display. Other controls 15 disposed on the tablet 12 are adapted to allow a user to select a digital sheet music when prompted by the display, such as up and down controls.

The hands-free music notation display system 11 further comprises a control module 17 having one or more foot pedals 14, wherein the foot pedals 14 are wirelessly connected to the tablet 12 and the operating components therein. The control module 17 houses the electrical wiring of the pedals 14. In some embodiments, the foot pedals 14 comprise a wired connection to the tablet. The control module 17 further includes a wireless transmitter 39 adapted to engage with a wireless receiving unit disposed in said tablet. The pedals 14 are adapted to provide the ability for a user to display the following or previous page of the digital sheet music 36 with his or her foot, thereby allowing the user to remain hands-free in order to play his or her instrument.

Figure 3:
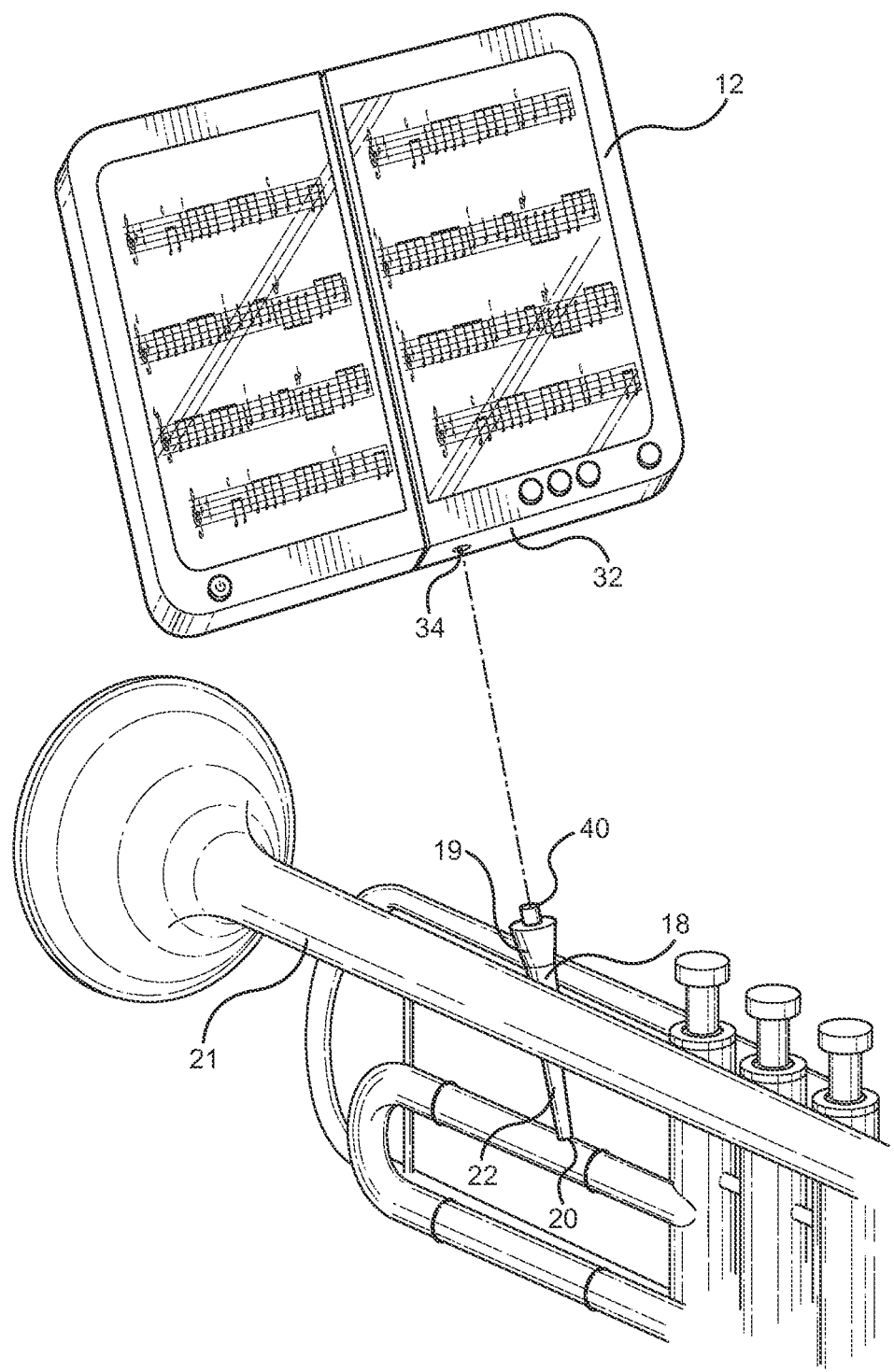
FIG. 3 shows a perspective view of the attachment mechanism removably secured to the tablet of the hands-free music notation display system.

Referring now to FIG. 3, there is shown perspective view of the attachment mechanism removably secured to the tablet of the hands-free music notation display system. The attachment mechanism 18 is removably secured to the tablet 12 and adapted to support the tablet 12 on various instruments in order to allow a user to play the instrument and utilize the digital sheet music while remaining hands-free. In the illustrated embodiment, the attachment mechanism 18 comprises an elongated shaft 22 having a first end 19 and a second end 20, wherein the first end is removably secured to the tablet 12 by a fastener. The fastener comprises mating parts having a circular recessed area 34 disposed on the lower end 32 of the tablet 12 and a protrusion 40 disposed on the upper end of the attachment mechanism 18. The recessed area 34 is adapted to receive the protrusion 40 therein. The protrusion 40 is circular and comprises the same diameter as the diameter of the recessed area 34 in order to fit securely therein. In other embodiments, any suitable fastener, such as a clip, can be used to removably secure the attachment mechanism 18 to the tablet 12.

The shaft 22 is tapered towards the second end 20 so as to be able to wedge between parts of a brass instrument 21, such as a trumpet. The tapering of the shaft 22 allows the attachment mechanism 18 to fit securely therebetween. In other embodiments, the attachment mechanism is a C-shaped clip that is adapted to wrap around a tubular part of an instrument. The upper part of the C-shaped clip comprises a protrusion 40 in order to removably secure to the recessed area 34 on the tablet 12.

In use, the second end 20 of the shaft 22 is inserted between parts of the brass instrument 21 until the tapered section does not allow the shaft 22 to be inserted any farther. The bottom edge of the tablet 12 is adapted to rest on the upper surface of the brass instrument 21 in order to provide further securement and stability thereto. In other embodiments, the attachment mechanism 18 comprises a vertical stand having a base adapted to rest flush on a horizontal support surface, such as the floor. In this way, the tablet 12 is adapted to be used with other families of instruments, such as string instruments, percussion instruments, or woodwind instruments, among others.

Figure 4:
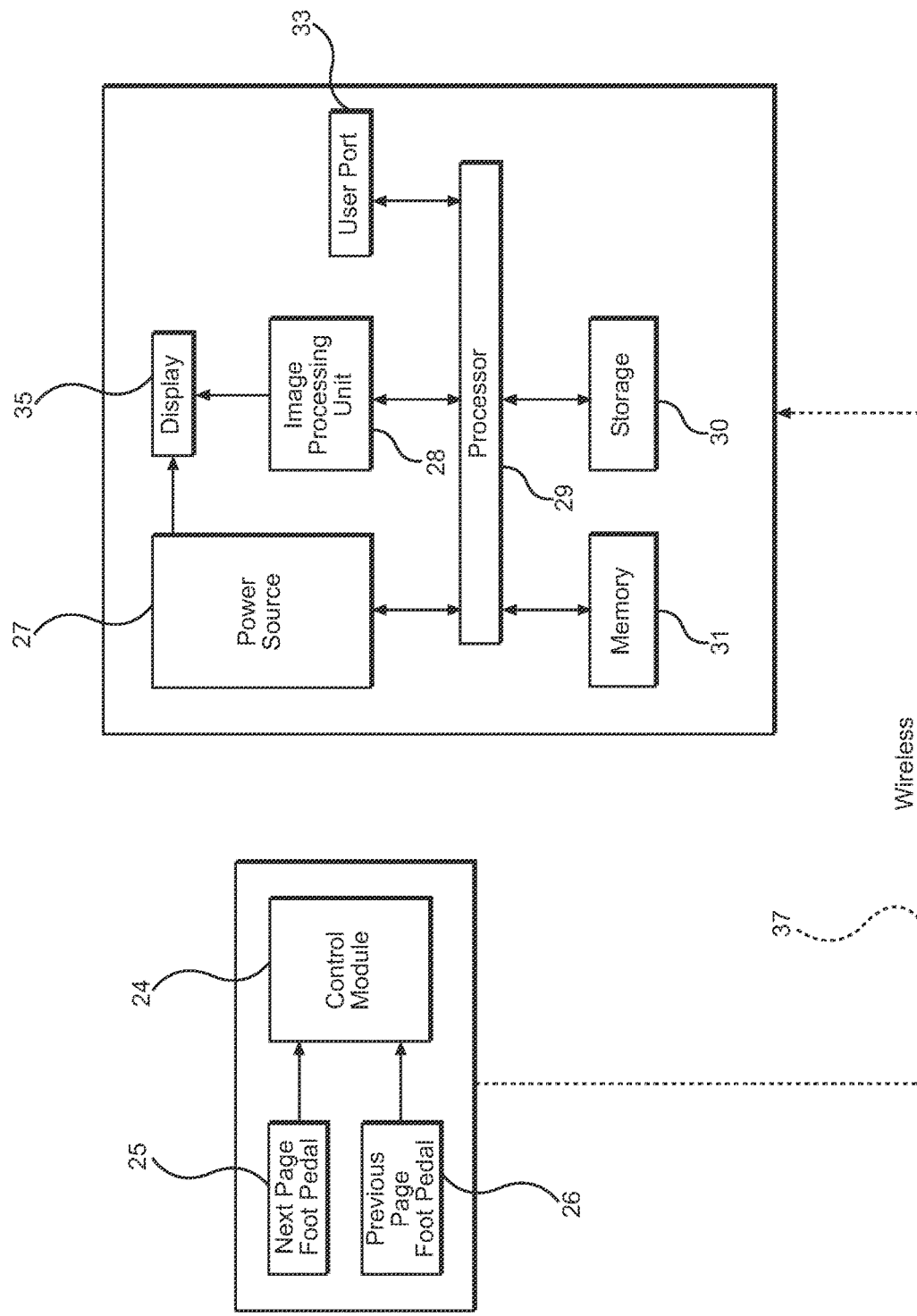
FIG. 4 shows a schematic diagram of the hardware components of the hands-free music notation display system.

Referring now to FIG. 4, there is shown a schematic diagram of the hardware components of the hands-free music notation display system. The system comprises a processing unit 29 and a storage medium 30 that are housed within the tablet. The processing unit 29 is preferably a microprocessor and the storage medium 30 comprises the operating system and data associated with the digital sheet music. An example of such a storage medium 30 is a hard drive. The tablet 12 further houses a main memory 31, wherein the main memory 31 is a random access memory (RAM), which facilitates loading and unloading of requested software application sectors, such as graphics and the like. The hands-free music notation display system further comprises a communication link 37 and a control module 24 that allows the next page or the previous page of the digital sheet music to be displayed on the tablet screen via foot pedals 25, 26. The communication link 37 permits a wireless connection between the tablet and the control module 24. For example, a Bluetooth or radio antenna may be housed within the tablet and in communication with a small receiving antenna that is housed within the control module 24.

The hands-free music notation display system further comprises a power source 27, wherein the power source 27 is activated via the power button disposed on the exterior surface of the tablet. When the power source 27 is activated, essential portions of the operating system are loaded from the storage medium 30 into the main memory 31. The operating information, such as the digital sheet music to be displayed on the screen of the tablet is also loaded into main memory 31 as part of a start-up sequence. As the user selects the digital sheet music to be displayed via the buttons disposed on the exterior surface of the tablet, input is loaded into memory 31, processed via the processing unit 29 and the corresponding information is looked up in the storage medium 30. Visual output signals are sent to the display 35 to prompt a user to make a digital sheet music selection. Visual output signals are then provided to a user in the form of digital sheet music and one or more music notations thereon.

The system further includes a user port 33 in any suitable form, such as USB port, adapted to allow a user to input new digital sheet music on to the system. The user port 33 is adapted to connect to a removable storage medium, such as a DVD, CD-ROM, Blu-ray disc, flash drive or other removable storage medium on which data and software can be stored. The hands-free music notation display system further comprises an image processing unit 28 to facilitate the display of digital sheet music on the tablet. The image processing unit 28 is adapted to read and process the material on the removable storage medium.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hands-free music notation system, comprising:
a tablet comprising one or more screens adapted to display one or more pages of digital sheet music thereon;
one or more foot pedals adapted to allow said tablet to display a previous or next page of said digital sheet music;
a processor;
a storage, wherein said storage retains an operating system and data associated with said one or more pages of digital sheet music;
a main memory;
a user port;
an image processing unit;
a communication link;
a power source;
wherein said processor, said storage, said main memory, said user port, said image processing unit, said communication link, and said power source are housed within and electrically connected to said tablet;
wherein said communication link operatively connecting said tablet and said one or more foot pedals and components housed therein;
a shaft having a first end and a second end, wherein said first end is removably secured to a lower edge of said tablet by a fastener and tapers along a longitudinal axis of the shaft toward said second end thereof, such that the entire second end of the shaft comprises a smaller width than the width of the first end of the shaft, wherein the width is measured perpendicular to the longitudinal axis;
said fastener comprises a circular recessed area disposed directly on said lower edge of said tablet and a protrusion disposed on said first end of said shaft, wherein said circular recessed area is adapted to receive said protrusion therein;
wherein the tablet, the protrusion, and the shaft are linearly aligned along the longitudinal axis.

2. The hands-free music notation system of claim 1, wherein said screen comprises a liquid crystal display (LCD) screen.

3. The hands-free music notation system of claim 1, wherein said tablet comprises a first section adjustably secured to a second section by one or more hinges, such that said tablet can be folded for compact configuration.

4. The hands-free music notation system of claim 1, wherein the tablet is not able to move about the shaft once secured thereto via the fastener.

* * * * *